(12) United States Patent
Veik

(10) Patent No.: US 8,264,188 B2
(45) Date of Patent: Sep. 11, 2012

(54) VOLTAGE REGULATED DC SUPPLY CIRCUIT FOR A WIRE FEED DRIVE SYSTEM

(75) Inventor: Brian James Veik, Nennah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 377 days.

(21) Appl. No.: 12/482,319

(22) Filed: Jun. 10, 2009

(65) Prior Publication Data
US 2010/0027978 A1 Feb. 4, 2010

Related U.S. Application Data

(60) Provisional application No. 61/085,334, filed on Jul. 31, 2008.

(51) Int. Cl.
*G05B 11/28* (2006.01)
(52) U.S. Cl. .......................................... 318/599; 318/811
(58) Field of Classification Search .................. 318/599, 318/811, 139, 727
See application file for complete search history.

(56) References Cited

U.S. PATENT DOCUMENTS

| | | | |
|---|---|---|---|
| 4,508,954 A | | 4/1985 | Kroll |
| 4,677,366 A | * | 6/1987 | Wilkinson et al. ............ 323/222 |
| 5,235,504 A | * | 8/1993 | Sood ............................. 363/53 |
| 5,621,627 A | | 4/1997 | Krawchuk et al. |
| 6,002,103 A | * | 12/1999 | Thommes ................ 219/130.21 |
| 6,091,612 A | * | 7/2000 | Blankenship ................... 363/45 |
| 6,204,479 B1 | | 3/2001 | Sickels |
| 6,239,407 B1 | * | 5/2001 | Thommes ................ 219/130.21 |
| 6,504,132 B1 | * | 1/2003 | Church ....................... 219/130.1 |
| 6,639,369 B2 | * | 10/2003 | Ribarich ....................... 315/307 |
| 7,098,425 B2 | | 8/2006 | Meckler |
| 2005/0206973 A1 | | 9/2005 | Shoji et al. |
| 2006/0243716 A1 | * | 11/2006 | Stava et al. ................. 219/130.5 |

OTHER PUBLICATIONS

International Search Report for application No. PCT/US2009/045915 mailed Sep. 1, 2009.
Written Opinion for application No. PCT/US2009/045915 mailed Sep. 1, 2009.

* cited by examiner

*Primary Examiner* — Rina Duda
(74) *Attorney, Agent, or Firm* — Fletcher Yoder, P.C.

(57) ABSTRACT

Systems and methods relating to a boosting rectifier and feeder motor drive circuit are provided. The circuit may be used to produce a regulated DC supply voltage from a variable input AC line voltage, chop the DC supply voltage and deliver a pulse width modulated motor voltage to a wire feed motor in the wire drive assembly. One embodiment relates to elimination of undesirable wire feeder inconsistencies due to motor loading conditions, distance between the primary power source and the wire feeder, and so forth. In certain embodiments, the circuit may contain power factor correction circuitry, which may reduce the size of circuit components due to increased efficiency. Current paths through the circuit during the positive and negative half cycles of the AC input voltage are provided. Exemplary controller logic that may be used to control the operation of the boosting rectifier and feeder motor drive circuit is provided.

20 Claims, 7 Drawing Sheets

VOLTAGE REGULATED DC SUPPLY CIRCUIT FOR A WIRE FEED DRIVE SYSTEM

CROSS REFERENCE TO RELATED APPLICATIONS

This application is a U.S. Non-provisional Patent Application of U.S. Provisional Patent Application No. 61/085,334, entitled "Voltage Regulated DC Supply Circuit for a Wire Feed Drive System", filed Jul. 31, 2008, which is herein incorporated by reference.

BACKGROUND

The present disclosure relates generally to welding systems and welding wire feed systems, and more particularly, to systems and methods for producing a regulated DC supply voltage from a variable AC source voltage.

Many types of welding systems, such as metal inert gas (MIG) welding, utilize continuously fed consumable wire from a welding torch during a welding operation. A wire feed motor is responsible for maintaining a continuous wire feed to the welding operation even when system demands require the motor torque to increase. Common factors such as wire diameter, wire type, drive roll type, drive roll tension, wire spool tension, torch cable length, and torch cable orientation may contribute to an increase in the motor torque requirement. Additionally, factors associated with the way a user sets up the wire feed system, such as positioning the wire feeder in a location remotely located from the primary power source, applying high drive roll tension, increasing cable length, and so forth can impact the motor torque requirement.

The voltage necessary to drive the motor and maintain the necessary motor torque is derived from a DC voltage supply, which is generated from a variable AC source voltage. Traditionally, the DC voltage supply is unregulated, and the magnitude of the unregulated DC voltage supply is directly dependent on the magnitude of the input AC source voltage. As the magnitude of the AC input supply at the wire feeder is reduced, the DC supply voltage available to the motor is also reduced. When the magnitude of the DC supply voltage falls below the requirement to maintain desired wire feed speed, the wire feed drive system no longer continually outputs the desired amount of wire. Accordingly, it is now recognized that a regulated, stable DC supply voltage is necessary for optimal wire feed motor performance.

BRIEF DESCRIPTION

The present disclosure is directed to systems and methods relating to a boosting rectifier and feeder motor drive circuit. One embodiment of the present disclosure relates to the elimination of undesirable wire feeder inconsistencies due to factors such as motor loading conditions, increased distance between the primary power source and the wire feeder, and so forth. In particular, the present disclosure provides a circuit that may be used to produce a regulated DC supply voltage from a variable input AC line voltage, chop the DC supply voltage and deliver a pulse width modulated motor voltage to a wire feed motor in the wire drive assembly. In certain embodiments, the circuit may contain power factor correction circuitry, which may reduce the size of circuit components and increase the utilization of available AC current. Exemplary controller logic that may be used to control the operation of the boosting rectifier and feeder motor drive circuit is provided.

DRAWINGS

These and other features, aspects, and advantages of the present disclosure will become better understood when the following detailed description is read with reference to the accompanying drawings in which like characters represent like parts throughout the drawings, wherein.

Figure 6:
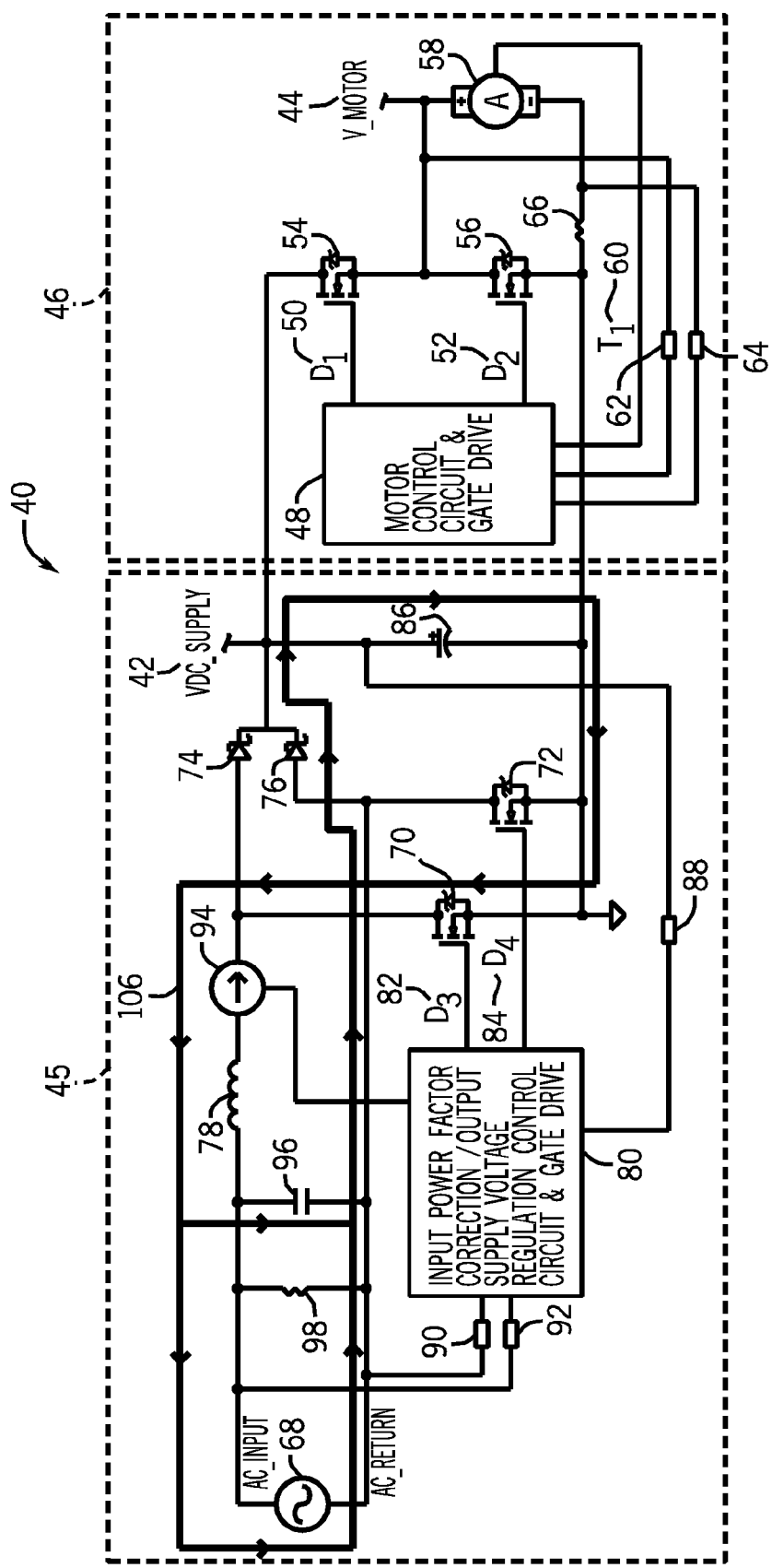
Figure 7:
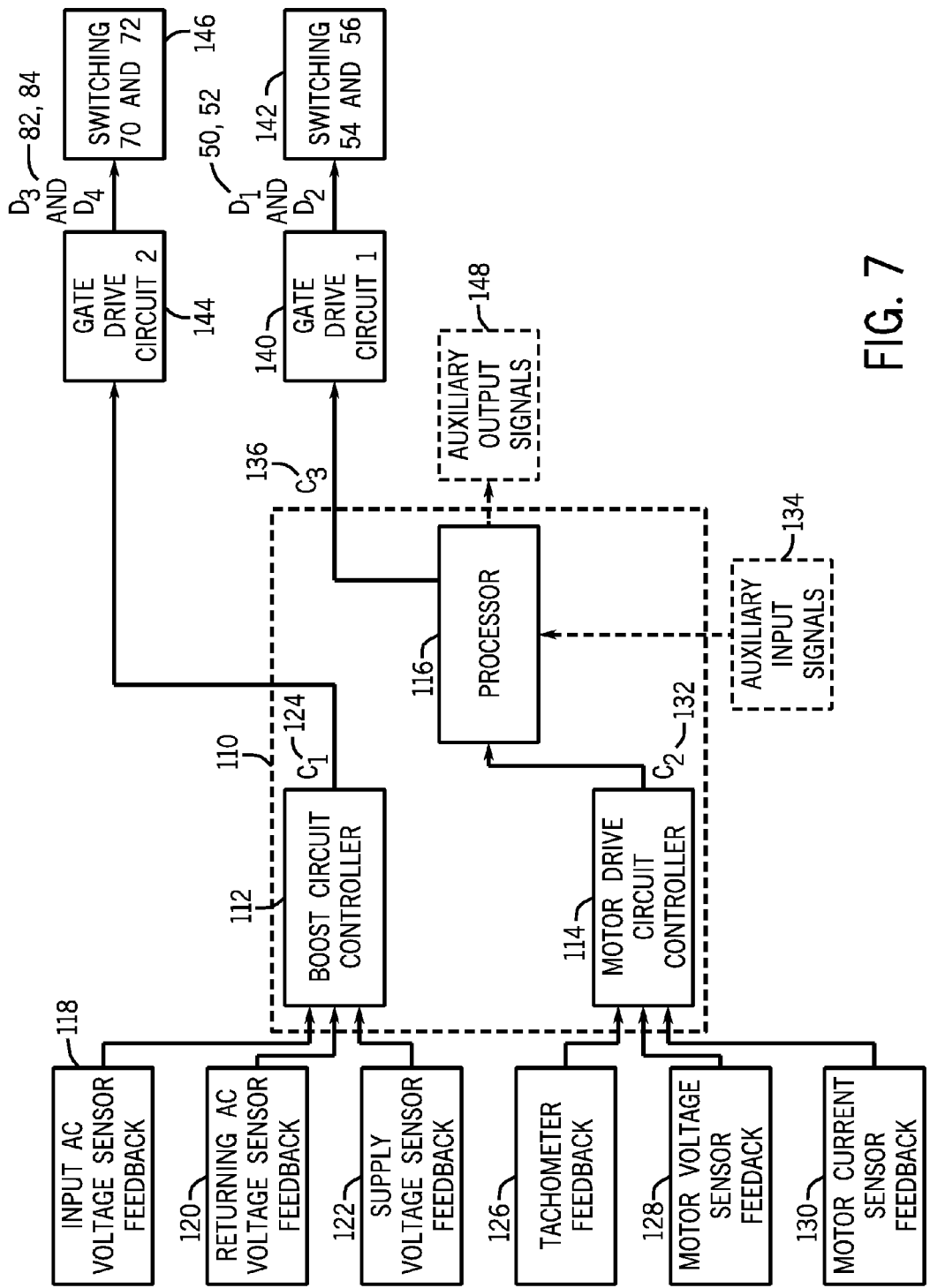

FIG. 6 is an exemplary circuit diagram illustrating the second current path through the boost circuit generated during the negative half cycle of the AC input voltage in accordance with aspects of the present disclosure; and FIG. 7 illustrates exemplary controller logic that may be used to control the operation of a boosting rectifier and feeder motor drive circuit in accordance with aspects of the present disclosure.

DETAILED DESCRIPTION

As discussed in further detail below, various embodiments of a circuit that may be used to produce a regulated DC supply voltage from a variable input AC line voltage for a wire feed motor that supplies wire to a welding operation are provided. During operation, the circuit chops the DC supply voltage and delivers a pulse width modulated motor voltage to a wire feed motor in a wire drive assembly. The circuit is capable of power factor correction, which may increase circuit efficiency as compared to traditional circuits, thereby reducing the size of circuit components. The disclosed embodiments include current paths that may be established through the circuit during the positive and negative half cycles of an AC input voltage. The circuit is capable of maintaining the constant DC supply voltage regardless of input voltage, loading restrictions, and so forth, ensuring that user setup and equipment variability do not affect wire feeder performance during a weld.

Figure 1:
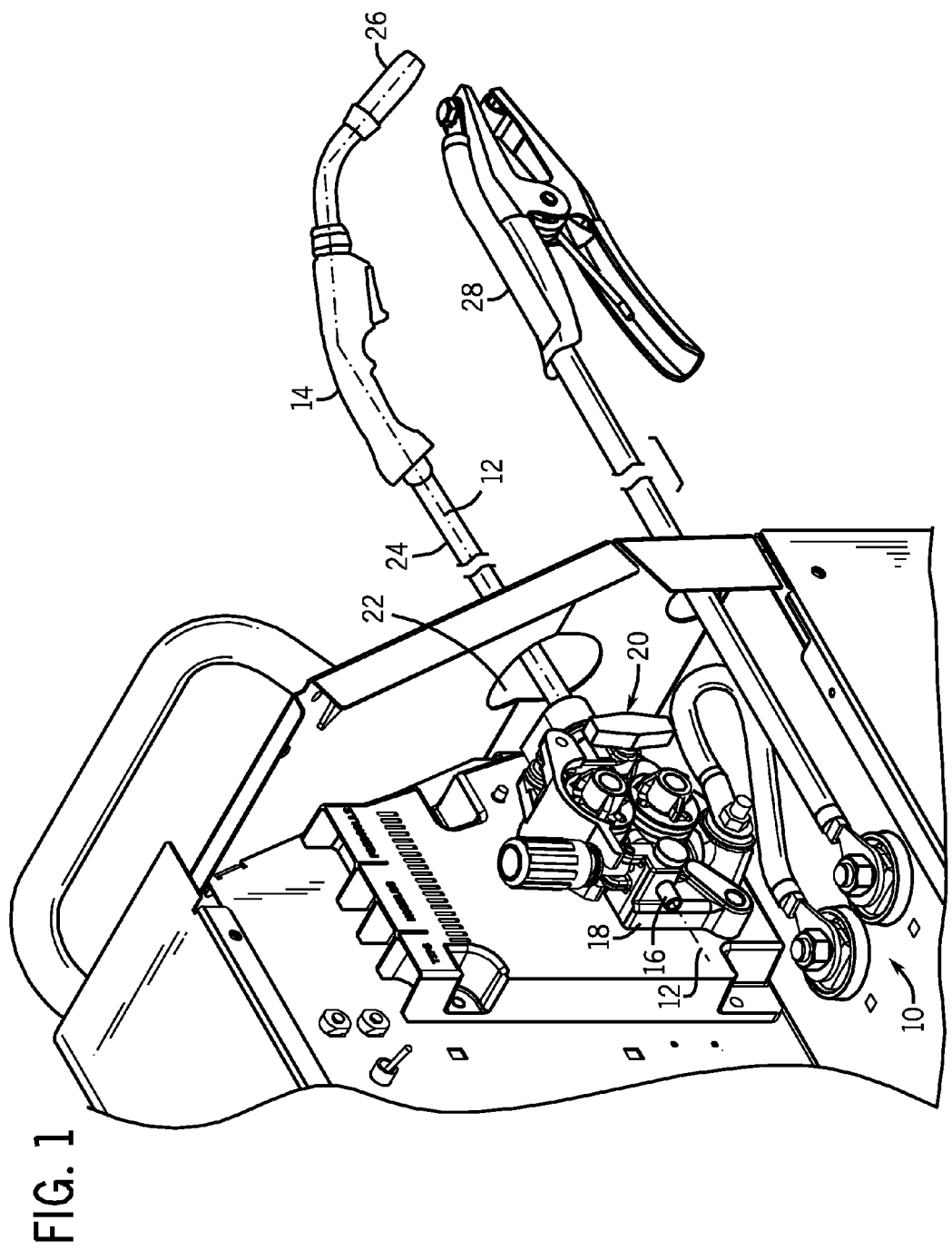
FIG. 1 illustrates an exemplary wire feed system that supplies wire for a welding operation in accordance with aspects of the present disclosure.

FIG. 1 illustrates an exemplary wire feed system 10 that supplies wire 12 through a torch 14 to a welding operation. It should be noted that in some embodiments the wire feed system 10 may be integrated into a welder (not shown). The welding operation will typically be a metal inert gas (MIG) operation that utilizes a continuous feed of welding wire 12 as an electrode, and, during operation, the welding wire 12 is consumed. However, those skilled in the art would understand that the present disclosure also relates to similar operations that may be performed in which weldments are formed without shielding gases, such as by the use of flux-cored wire. Accordingly, the system described herein is envisaged for use with all such operations where wire 12 is supplied to a location where welding is carried out.

As illustrated in FIG. 1, welding wire 12 is spooled into an inlet guide 16, which contains an aperture through which the wire 12 enters. After passing through the inlet guide 16, the wire 12 is fed through a feed head assembly 18, which receives and transfers the wire 12 into a wire drive assembly 20. The wire drive assembly 20 contains a wire feed motor that powers the feeding of the wire through the wire drive assembly 20. Upon exiting the wire drive assembly 20, the wire 12 is fed through an opening 22 for use in the welding operation. In some embodiments, the wire 12 may be fed into a cable 24 that passes through the opening 22 and that connects to a torch 26 through which the wire 12 exits for use in the welding operation. During a welding operation, a work lead clamp 28 typically connects to a workpiece to close the circuit between the torch 26, a work piece, and a power supply unit, and to ensure proper current flow.

As previously mentioned, the present disclosure provides circuitry that produces a tightly regulated DC supply voltage from a variable input AC line voltage. The DC supply voltage becomes the voltage source for the wire feed motor in the wire drive assembly 20. Accordingly, the circuitry provided generates a regulated DC supply voltage that remains higher than the possible motor voltage demand during operation. During operation, the regulated DC supply voltage may be chopped and delivered to the wire feed motor in a continuously monitored pulse width modulated fashion to maintain a desired operating speed and a consistent wire feed. Since the regulated DC supply voltage is maintained at a magnitude greater than the required motor voltage under maximum imposed motor loading conditions, the circuitry allows for sufficient motor torque to be maintained even when the system is placed under strenuous setup or operating conditions. Accordingly, the present disclosure provides methods and systems that eliminate the effect that user setup and equipment variability typically have on consistent wire feeding for a welding operation.

Figure 2:
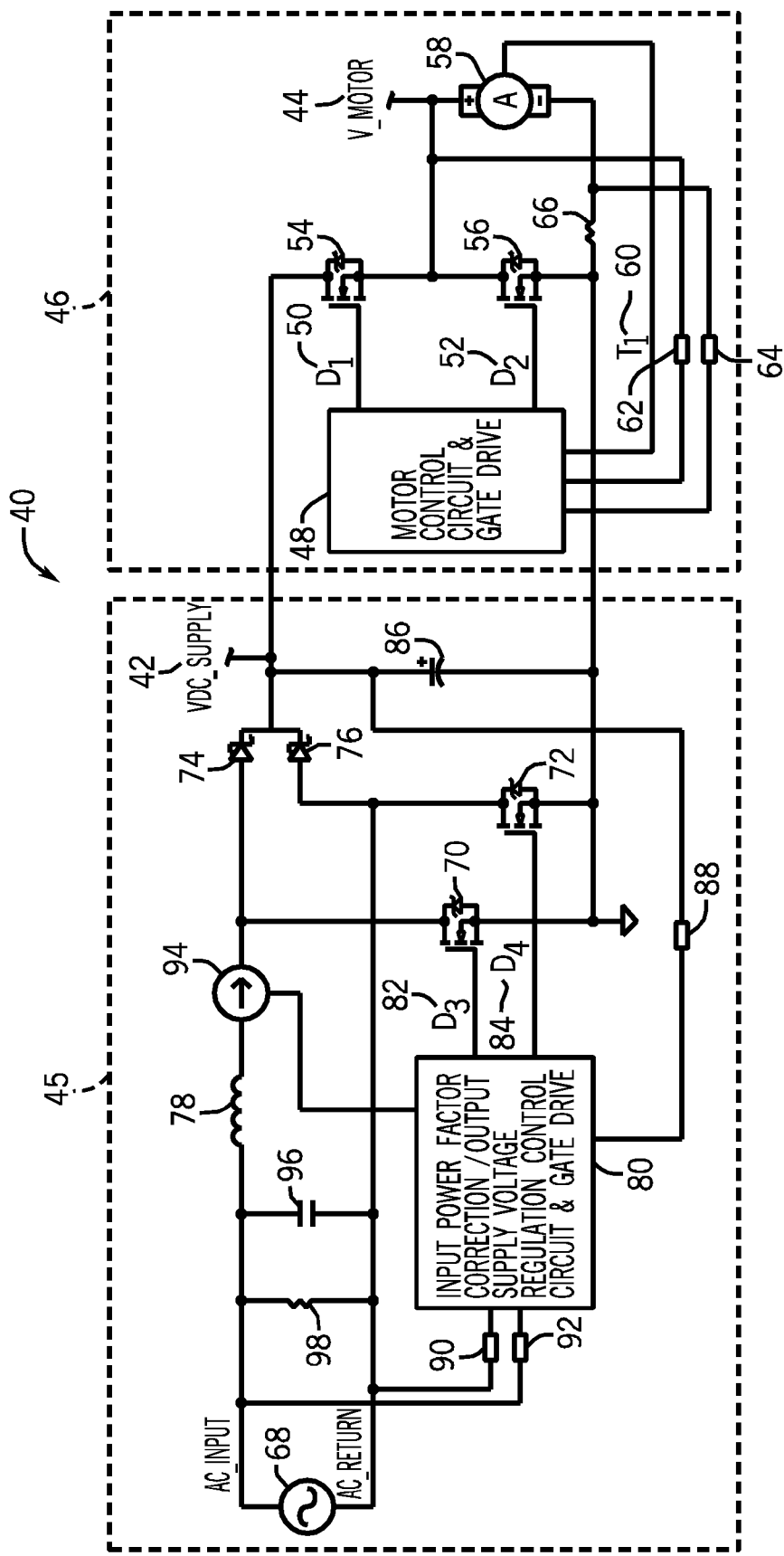
FIG. 2 is an exemplary circuit diagram illustrating an exemplary boosting rectifier and feeder motor drive circuit that may be used to produce a regulated DC supply voltage from a variable input AC line voltage in accordance with aspects of the present disclosure.

Internal components of the wire feed system 10 in FIG. 1 receive power from a primary power supply, such as a wall outlet, a generator, a battery and so forth, or a primary transformer and then supply power to circuitry that enables the wire feed motor to maintain a desired setpoint necessary for the welding operation. FIG. 2 illustrates an exemplary boosting rectifier and feeder motor drive circuit 40 that may be used to produce a regulated DC supply voltage 42, which may be referred to as the supply voltage 42, from a variable input AC line voltage, chop the supply voltage 42 and deliver a pulse width modulated (PWM) motor voltage 44 to the wire feed motor in the wire drive assembly 20. For descriptive purposes, the circuit 40 may be broken up into two sub-circuits, an input AC voltage rectifier and power factor correction (PFC) boost circuit 45, which may be referred to as the boosting rectifier circuit 45 and a wire feeder motor drive circuit 46. The boosting rectifier circuit 45 converts the AC input voltage to the regulated DC output supply voltage 42 at a magnitude greater than the needed motor voltage 44. Additionally, the boosting rectifier circuit 45 provides power factor correction, which ensures that the input current is efficiently translated into output power. Power factor correction is an important function of the boosting rectifier circuit 45 since it is desirable to minimize the volt-ampere requirement of a control transformer located in the primary power source from which the boosting rectifier circuit 45 receives power. The control transformer is integral to the overall system since it steps down the primary input AC line voltage to an isolated low voltage AC supply. Additionally, power factor correction reduces the AC line current carried on a cable between the wire feed system 10 and a primary power source, which reduces the voltage drop across the cable and allows the wire feed system 10 to be more distant from the primary power source.

The motor drive circuit 46 creates the motor voltage 44 necessary to drive the motor from the supply voltage 42 via motor control and gate drive circuitry 48. The motor control and gate drive circuitry 48 output drive signals 50, 52 that directly control the toggling of the first PWM transistor 54 and the second PWM transistor 56. The toggling of the transistors 54, 56 allows the motor drive circuit 46 to step down the supply voltage 42 to the required motor voltage 44 via pulse width modulation as dictated by the demands of the wire feed system 10. A tachometer 58 measures the rotation speed in a shaft of the wire feed motor and outputs a signal 60 that communicates the number of motor revolutions per minute to the motor control and gate drive circuitry 48 for processing. A voltage sensor 62 and a current sensor 64 measures the voltage and current, respectively, being supplied to the wire feed motor. By measuring the voltage drop across a resistor 66, the current through the wire feed motor may be determined. In this way, the resistor 66 may be used instead of the current sensor 64.

The boosting rectifier circuit 45 receives a variable input AC voltage from a primary voltage source 68, such as a 60 Hz, 120V sine wave from a typical wall outlet. The boosting rectifier circuit 45 both rectifies this AC voltage and provides power factor correction that maximizes the amount of input current that is translated to output power. A first boost transistor 70, a second boost transistor 72, a first boost diode 74, a second boost diode 76, and an inductor 78 form a boosting rectifier that efficiently converts the AC input voltage to the DC output supply voltage 42 while reducing the number of diode drops in the boosting rectifier circuit 45 as compared to traditional designs. Components of the boosting rectifier circuit 45 may be reduced as compared to traditional designs since certain components of the bridge rectifier and the boost circuit is shared in the present disclosure. Control and gate drive circuitry 80 modulate the toggling of the boost transistors 70, 72 via control signals 82, 84. The transistors 70, 72 are modulated to maintain the regulated DC supply voltage 42 within a predetermined tolerance and to correct the power factor of the input AC voltage. A bulk capacitor 86 is configured to function as a filter capacitor, storing DC charge and producing a steady DC supply voltage 42 from the rectified AC input. Since the boosting rectifier circuit 45 provides power factor correction, the boosting rectifier circuit 45 may operate at a high voltage, thereby reducing the size of the bulk capacitor 86 and the ripple current through the bulk capacitor 86 as compared to traditional designs.

A voltage sensor 88 measures the supply voltage 42 and communicates it to the control and gate drive circuitry 80 for processing. An additional voltage sensor 90 measures the input AC voltage, and another voltage sensor 92 measures the returning AC voltage. The voltage sensors 90, 92 communicate with the control and gate drive circuitry 80. A line current sensor 94 measures the inductor 78 current and communicates it to the control and gate drive circuitry 80 for processing. In certain embodiments, the primary voltage source 68 may be remotely located with respect to the other circuit components. In embodiments wherein the primary voltage source 68 is remotely located, a capacitor 96 may be used as a local energy storage device. Additionally, in such embodiments, a resistor 98 may be included to function as a bleed resistor for the capacitor 96 in instances when the AC source 68 may be removed.

Figure 3:
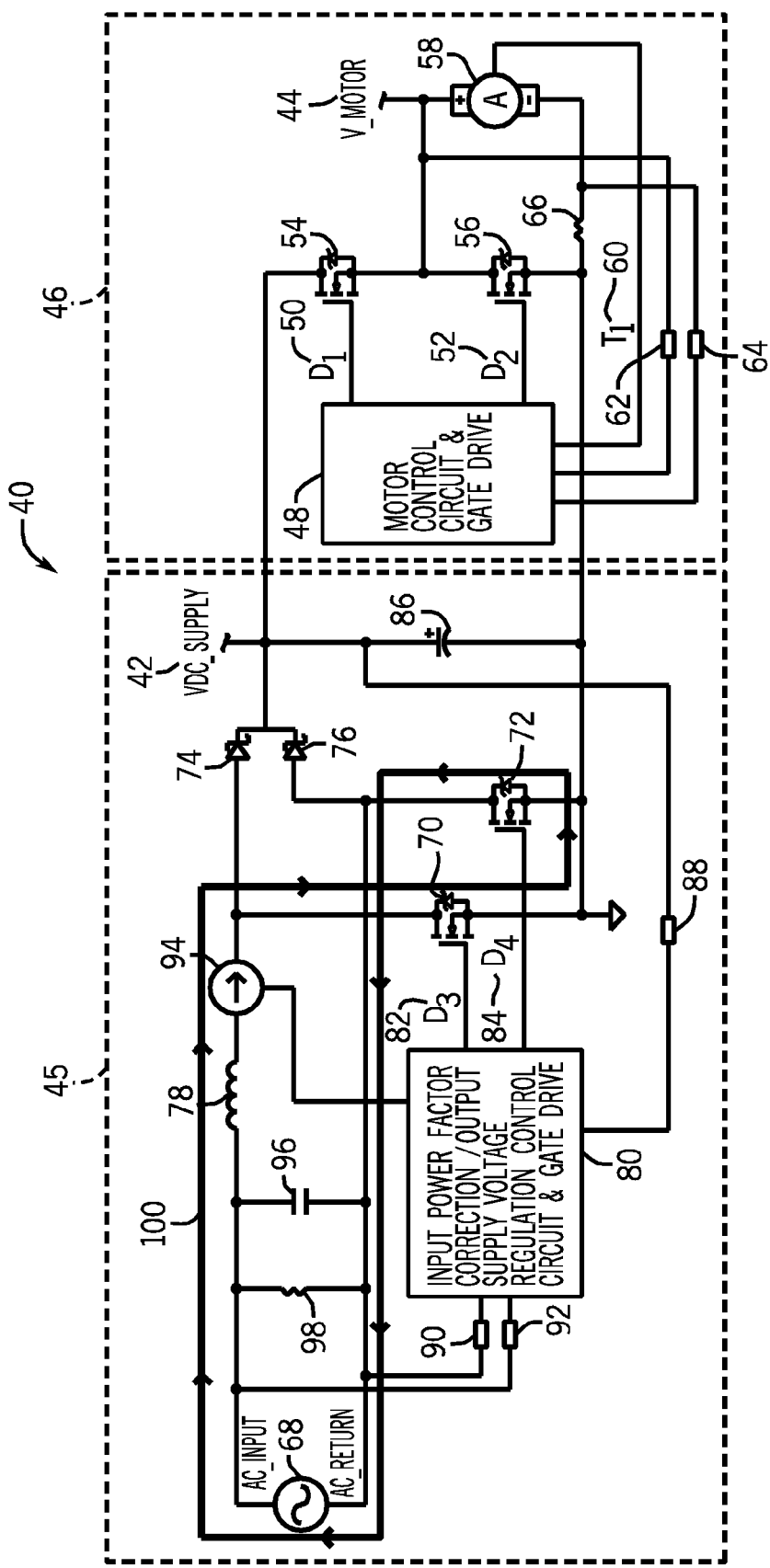
FIG. 3 is an exemplary circuit diagram illustrating the first current path through the boost circuit generated during the positive half cycle of the AC input voltage in accordance with aspects of the present disclosure.
Figure 4:
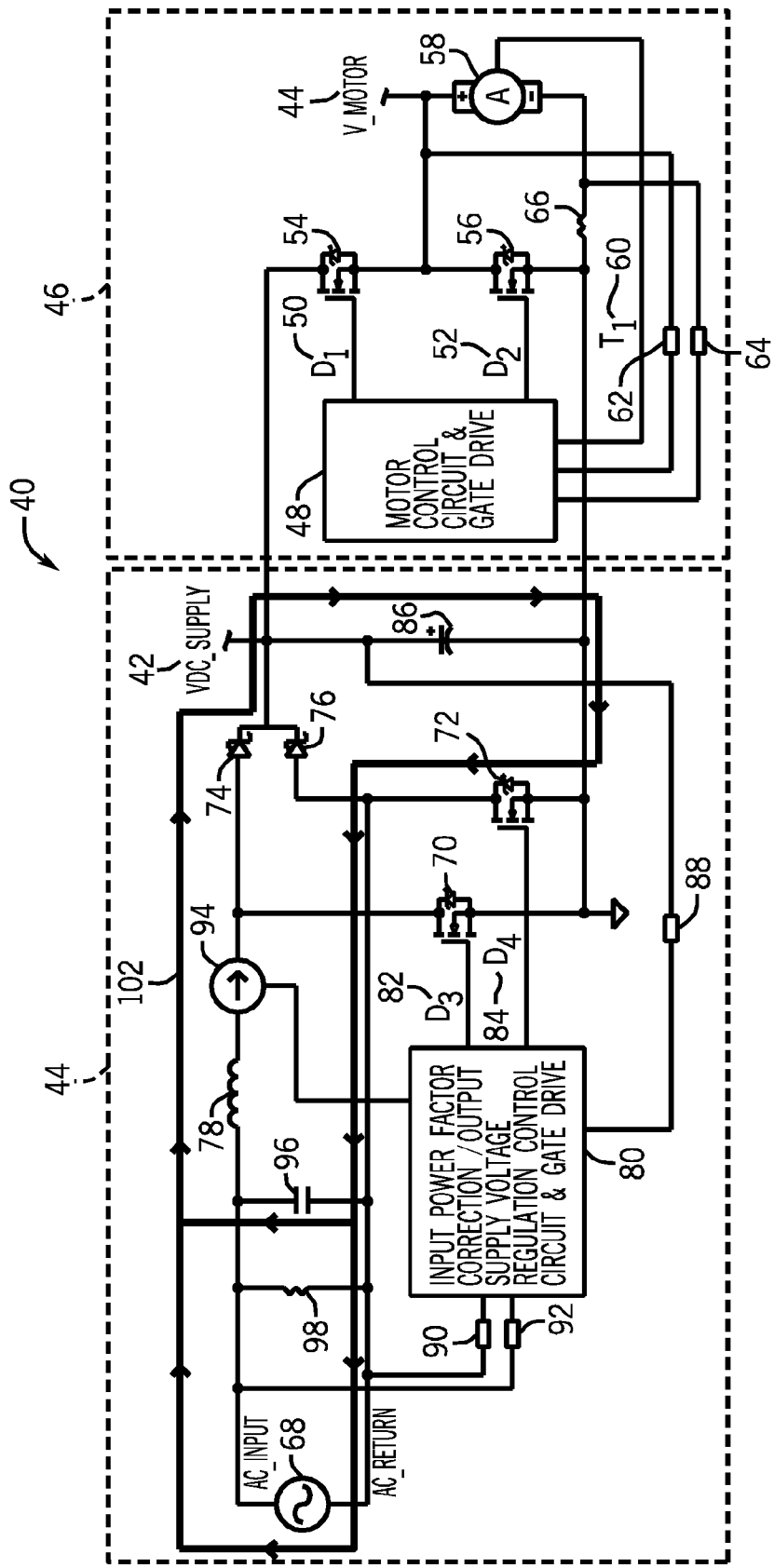
FIG. 4 is an exemplary circuit diagram illustrating the second current path through the boost circuit generated during the positive half cycle of the AC input voltage in accordance with aspects of the present disclosure.

FIGS. 3 and 4 illustrate the current paths 100, 102 through the boosting rectifier circuit 45 generated during the positive half cycle of the AC input voltage during operation of the circuit 40. The positive half cycle occurs when the voltage at AC_INPUT is more positive with respect to AC_RETURN. When the control circuitry 80 determines that the positive half cycle has begun, as indicated by the sensors 90, 92, the first boost transistor 70 is gated on. The second boost transistor 72 is also gated on by the control circuitry 80 for the entire positive cycle duration. When the transistors 70, 72 turn on, a first positive cycle current path 100 is established from the AC source 68 through the inductor 78, the line current sensor 94, the first boost transistor 70, the second boost transistor 72, and back to the AC source 68 as illustrated in FIG. 3. During the on-time of the transistor 70, energy is stored in the inductor 78. When the first boost transistor 70 is switched into the off-state as determined by the control circuitry 80, energy previously stored in the inductor 78 establishes a current path 102 through the diode 74, the bulk capacitor 86, the second boost transistor 72, the capacitor 96, and back to the inductor 78 as illustrated in FIG. 4. During the off-time of the first boost transistor 70, energy stored in the inductor 78 is transferred to the bulk capacitor 86. This effectively charges the bulk capacitor 86 to the set point DC supply voltage 42.

Figure 5:
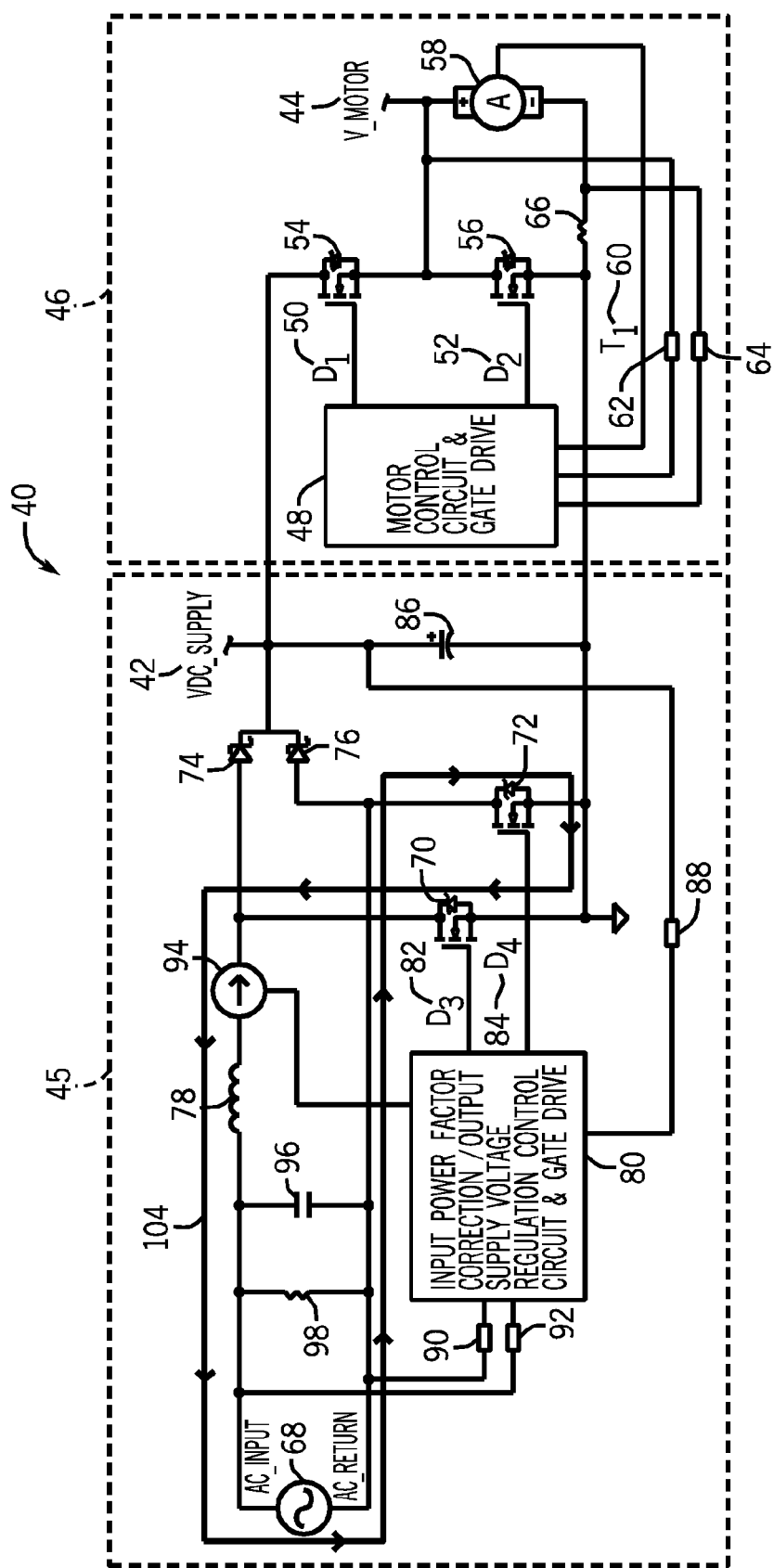
FIG. 5 is an exemplary circuit diagram illustrating the first current path through the boost circuit generated during the negative half cycle of the AC input voltage in accordance with aspects of the present disclosure.

FIGS. 5 and 6 illustrate the current paths 104, 106 through the boosting rectifier circuit 45 generated during the negative half cycle of the AC input voltage during operation of the circuit 40. The negative half cycle occurs when the voltage at AC_RETURN is more positive with respect to AC_INPUT. When the control circuitry 80 determines the negative half cycle has begun, as indicated by the sensors 90, 92, the second boost transistor 72 is gated on as dictated by the control circuit 80. The first boost transistor 70 is also gated on for the entire negative cycle duration. This establishes a current path 104 from the AC source 68 through the second boost transistor 72, the first boost transistor 70, the line current sensor 94, the inductor 72, and back to the AC source 68 as illustrated in FIG. 5. During the on-time of the second boost transistor 72, energy is stored in the inductor 78. When the second boost transistor 72 is switched into the off-state as determined by the control circuitry 80, energy previously stored in the inductor 78 establishes a current path 106 through the capacitor 96, the diode 76, the bulk capacitor 86, the first boost transistor 70, and back to the inductor 78 as illustrated in FIG. 6. During the off-time of the second boost transistor 72, energy stored in the inductor 78 is transferred to the bulk capacitor 86. This effectively charges the bulk capacitor 86 to the set point DC supply voltage 42.

FIG. 7 is a block diagram illustrating exemplary processing logic that may be used to directly control the DC voltage supply output 42 and the motor voltage output 44. In the illustrated embodiment, a controller 110 includes a boost circuit controller 112, a motor drive circuit controller 114, and a processor 116, which receive feedback signals from and deliver commands to the boosting rectifier and feeder motor drive circuit 40. The boost circuit controller 112 and the motor drive circuit controller 114 may include software, memory, circuitry, and so forth. The boost circuit controller 112 may receive signals regarding the functioning of the input AC voltage rectifier and PFC boosting rectifier circuit 45, such as feedback from the input AC voltage sensor 92, as represented by block 118, feedback from the returning AC voltage sensor 90, as represented by block 120, and feedback from the supply voltage sensor 88, as represented by block 122. The boost circuit controller 112 may then output a control signal 124 based on its inputs. Similarly, the motor drive circuit controller 114 may receive signals regarding the wire feeder motor drive circuit 46, such as feedback from the tachometer 58, as represented by block 126, feedback from the motor voltage sensor 62, as represented by block 128, and feedback from the motor current sensor 64, as represented by block 130.

The processor 116 receives a control signal 132 from the motor drive circuit controller 114 and integrates the information with any additional auxiliary input signals 134 it may receive such as user input, monitoring signals, additional control signals, and so forth. The processor 116 may then generate an output control signal 136 that drives the operation of the boosting rectifier and feeder motor drive circuit 40. The control signal 136 may be a pulse width modulation signal that includes a pulse width value as dictated by the demand of the motor. The control signal 136 may be received by a gate drive circuit, as represented by block 140, which provides the necessary gate drive signals 50 and 52 to drive the switching of the transistors 54 and 56, as represented by block 142. Similarly, the control signal 124 may be received from the boost circuit controller 112 by a gate drive circuit, as represented by block 144, which provides the necessary gate drive signals 82 and 84 to drive the switching of the transistors 70 and 72 on and off, as represented by block 146. In certain embodiments, the processor 116 may output additional auxiliary signals 148, such as analog or digital outputs for monitoring and control of aspects of the wire feeding operation.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A welding system, comprising:
    a power supply configured to output power via an output bus, the power supply comprising:
        an internal bus for receiving alternating current (AC) power;
        a power factor correction, regulation, and control (PRC) circuit coupled in parallel with the internal bus;
        a boost circuit configured to be driven by the PRC circuit, wherein the boost circuit comprises a first switch and a second switch coupled across the output bus; and
        a rectifying circuit comprising a pair of diodes coupled to the input bus and to the output bus through the boost circuit;
    a wire feeder remotely located with respect to the power supply and comprising:
        a wire drive assembly having a wire feed motor configured to power feeding of wire through the wire drive assembly; and
        a motor drive circuit configured to receive the power from the output bus of the power supply and to utilize the received power to create a motor voltage to drive the wire feed motor; and
    wherein the power supply is configured to maintain the power on the output bus at a level that is greater than or equal to an anticipated maximum motor voltage demand during operation of the remotely located wire feeder.

2. The system of claim 1, wherein the power supply comprises a capacitor configured to store energy local to the boost circuit and the rectifying circuit such that the boost circuit and the rectifying circuit facilitate operation of the wire feed motor by compensating for variations in the AC power.

3. The system of claim 2, wherein a resistor is arranged in parallel with the capacitor to facilitate discharge of the energy from the capacitor.

4. The system of claim 1, wherein the PRC circuit is configured to coordinate toggling of the first switch and the second switch such that the output power on the output bus is maintained within a predetermined range.

5. The system of claim 4, wherein the predetermined range is determined by the anticipated maximum motor voltage demand.

6. The system of claim 1, comprising a primary power supply capable of providing the AC power to the internal bus.

7. The system of claim 1, wherein the motor drive circuit is configured to chop the power from the output bus of the power supply and to deliver a pulse width modulated motor voltage to the wire feed motor.

8. The system of claim 1, wherein the motor drive circuit comprises a pair of switches that are configured to be toggled to step down the power from the output bus of the power supply to produce the motor voltage.

9. The system of claim 1, wherein a controller of the PRC circuit is configured to receive feedback from an input AC voltage sensor, a returning AC voltage sensor, and a supply voltage sensor.

10. A welding system, comprising:
a power supply configured to produce and maintain a direct current (DC) supply voltage on an output bus, wherein the power supply comprises:
an input bus configured to receive a variable input alternating current (AC) voltage;
a boost circuit comprising first and second power switches coupled across the output bus;
a rectifier circuit comprising first and second diodes disposed electrically downstream of the first and second power switches, respectively; and
output conductors configured to transmit the produced supply voltage;
a wire feeder remotely located from the power supply and configured to receive the supply voltage from the output conductors of the power supply, wherein the wire feeder comprises:
a wire drive assembly having a wire feed motor configured to power feeding of wire through the wire drive assembly; and
a motor drive circuit configured to receive the supply voltage and to utilize the supply voltage to create a motor voltage to drive the wire feed motor; and
wherein the power supply is configured to maintain the supply voltage at a magnitude that is greater than or equal to an anticipated maximum motor voltage demand during operation of the remotely located wire feeder.

11. The system of claim 10, wherein the power supply comprises a power factor correction, regulation, and control circuit coupled in parallel with the input bus and configured to drive the boost circuit.

12. The system of claim 10, wherein the power supply comprises a capacitor configured to store energy local to the boost circuit and the rectifier circuit such that the boost circuit and the rectifier circuit facilitate operation of the wire feed motor by compensating for variations in the variable input AC voltage.

13. The system of claim 12, wherein a resistor is arranged in parallel with the capacitor to facilitate discharge of the energy from the capacitor.

14. The system of claim 10, wherein the motor drive circuit is configured to chop the supply voltage from the output conductors of the power supply and to deliver a pulse width modulated motor voltage to the wire feed motor.

15. The system of claim 10, wherein the power supply comprises an inductor arranged relative to a capacitor such that the inductor alternatively stores energy from the input AC voltage and releases the energy through the first and second diodes into the capacitor to facilitate charging the capacitor to a set point for the supply voltage.

16. A welding system, comprising:
a power supply configured to receive a variable alternating current (AC) input at an input bus and to utilize the AC input to produce a direct current (DC) supply voltage at an output bus, wherein the power supply comprises a boosting circuit having first and second power switches and a rectifying circuit having first and second diodes disposed electrically downstream of the first and second power switches, respectively; and
a wire feeder remotely located from the power supply and coupled to the output bus of the power supply, wherein the wire feeder comprises a wire feed motor configured to power feeding of wire through a wire drive assembly and a motor drive circuit configured utilize the DC supply voltage to create a motor voltage to drive the wire feed motor, wherein the DC supply voltage is maintained at a magnitude that is greater than or equal to an anticipated maximum motor voltage demand during operation of the remotely located wire feeder.

17. The system of claim 16, wherein the motor drive circuit comprises a pair of switches that are configured to be toggled to step down the power from the output bus of the power supply to produce the motor voltage.

18. The system of claim 16, wherein the motor drive circuit is configured to chop the DC supply voltage from the power supply and to deliver a pulse width modulated motor voltage to the wire feed motor.

19. The system of claim 16, wherein the power supply comprises an inductor arranged relative to a capacitor such that the inductor alternatively stores energy from the input AC voltage and releases the energy through the first and second diodes into the capacitor to facilitate charging the capacitor to a set point for the DC supply voltage.

20. The system of claim 16, wherein the power supply comprises a power factor correction, regulation, and control circuit coupled in parallel with the input bus and configured to drive the boost circuit.

* * * * *